(12) United States Patent
Leymann et al.

(10) Patent No.: US 6,631,354 B1
(45) Date of Patent: Oct. 7, 2003

(54) DERIVING AND RUNNING WORKLOAD MANAGER ENCLAVES FROM WORKFLOWS

(75) Inventors: Frank Leymann, Aidlingen (DE); Dieter Roller, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,255

(22) Filed: Dec. 1, 1999

(30) Foreign Application Priority Data

Dec. 1, 1998 (EP) .............................................. 98122697

(51) Int. Cl.⁷ .............................................. G06F 17/60
(52) U.S. Cl. ............................ 705/8; 709/200; 709/101
(58) Field of Search .............................. 705/8; 709/201, 709/100

(56) References Cited

U.S. PATENT DOCUMENTS

| | | | | |
|---|---|---|---|---|
| 5,535,322 A | * | 7/1996 | Hecht .............................. | 705/1 |
| 5,537,542 A | * | 7/1996 | Eilert et al. .................. | 709/201 |
| 5,799,297 A | * | 8/1998 | Goodridge et al. ............ | 707/1 |
| 5,826,239 A | * | 10/1998 | Du et al. ........................ | 705/1 |
| 5,870,545 A | * | 2/1999 | Davis et al. ................ | 709/201 |
| 5,918,226 A | * | 6/1999 | Tarumi et al. ................. | 707/10 |
| 5,937,388 A | * | 8/1999 | Davis et al. .................... | 705/1 |
| 5,974,462 A | * | 10/1999 | Aman et al. ................ | 709/104 |
| 6,041,306 A | * | 3/2000 | Du et al. ........................ | 705/7 |
| 6,052,684 A | * | 4/2000 | Du ................................. | 707/8 |
| 6,067,548 A | * | 5/2000 | Cheng .................... | 707/103 R |
| 6,085,217 A | * | 7/2000 | Ault et al. ................... | 709/100 |
| 6,199,068 B1 | * | 3/2001 | Carpenter .................. | 707/100 |
| 6,311,144 B1 | * | 10/2001 | Abu El Ata .................... | 703/2 |
| 6,347,256 B1 | * | 2/2002 | Smirnov et al. ............ | 700/100 |

OTHER PUBLICATIONS

Leymann, F. and Roller, D., Workflow–based Applications, Sep. 10, 1996, IBM Systems Journal vol. 36, No. 1 1997, pp. 102–122, retrieved from ProQuest.*
Kwan, M.M. and Balasubramanian, P.R., Dynamic Workflow Management: A Framework for Modeling Workflows, Jan. 1997, System Sciences vol. 4, pp. 367–376, retrieved from IEEE.*
In D. J. Spoon: "Project Management Environment", IBM Technical Disclosure Bulletin, vol. 32, No. 9A, Feb. 1990, pp. 250 to 254.
In R. T. Marshak: "IBM's FlowMark, Object–Oriented Workflow for Mission–Critical Applications", Workgroup Computing Report (USA), vol. 17, No. 5, 1994, p. 3 to 13.
H. A. Inniss and J. H. Sheridan: "Workflow Management Based on an Object–Oriented Paradigm", IBM Technical Disclosure Bulletin, vol. 37, No. 3, Mar. 1994, p. 185.
F. Leymann and D. Roller: "Business Process Management with FlowMark", Digest of papers, Cat. No. 94CH3414–0, Spring COMPCON 94, 1994, pp. 230 to 234.

(List continued on next page.)

*Primary Examiner*—Tariq R. Hafiz
*Assistant Examiner*—Andre Boyce
(74) *Attorney, Agent, or Firm*—Scully, Scott, Murphy & Presser; Gail H. Zarick, Esq.

(57) ABSTRACT

A method of providing workload-management in a Workflow-Management-System (WFMS) includes a first method of automatically determining at least one enclave-graph within a process-model of a Workflow-Management-System (WFM), and a second method of executing the enclave-graphs. The method comprises an enclave-creation-step wherein if control-flow enters the enclave graph a first time, the WFMS creates a workload-management-enclave in the WLM on behalf of activities which are part of the enclave-graph. The method can comprise an enclave-join-step wherein the WFMS joins an activity of the enclave-graph to the workload-management-enclave in the WLM on behalf of the activity. Moreover the method can comprise an enclave-deletion-step for deleting the workload-management-enclave on behalf of the activities.

14 Claims, 3 Drawing Sheets

OTHER PUBLICATIONS

F. Leymann: "A meta model to support the modeling and execution of processes", Proceedings of the 11th European Meeting on Cybernetics and System Research EMCR92, Vienna, Austria, Apr. 21 to 24, 1992, World Scientific 1992, pp. 287 to 294.

"IBM FlowMark for OS/2", document No. GH 19–8215–01, IBM Corporation, 1994.

IBM MQSeries Concepts and Architecture, document No. GH 12–6285.

IBM MQSeries Getting Started with Buildtime, document No. SH 12–6286.

IBM MQSeries Getting Started with Runtime, document No. SH 12–6287.

F. Leymann and W. Altenhuber: "Managing business processes as an information resource", IBM Systems Journal, vol. 32(2), 1994; and.

D. Roller: "Verifikation von Workflows in IBM FlowMark", in J. Becker und G. Vossen (Hrsg.): "Geschaeftsprozess-modellierung und Workflows", International Thompson Publishing, 1995.

* cited by examiner

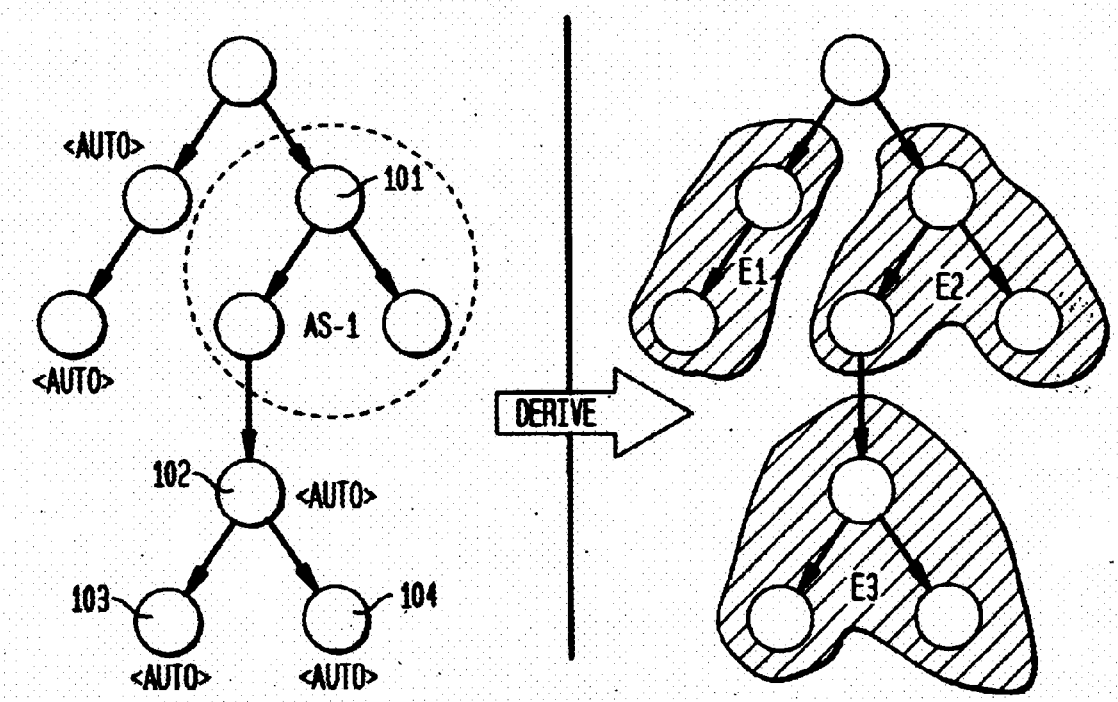

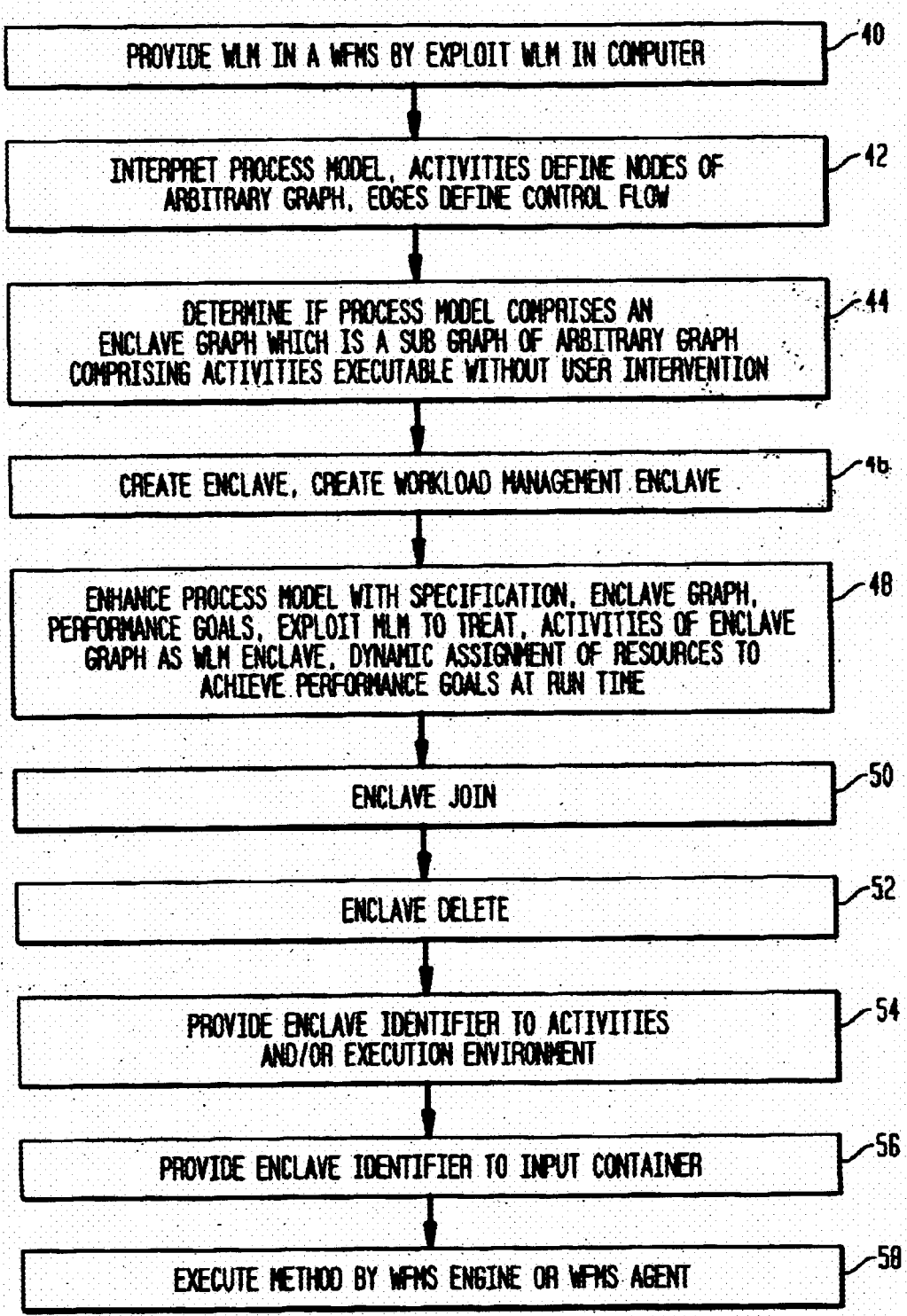

DERIVING AND RUNNING WORKLOAD MANAGER ENCLAVES FROM WORKFLOWS

BACKGROUND OF INVENTION

1. Technical Field

The present invention relates to the area of workload management/performance management. More particularly, the invention relates to a method of providing workload-management in a Workflow-Management-System (WFMS).

2. Prior Art

A new area of technology with increasing importance is the domain of Workflow-Management-Systems (WFMS). WFMS support the modeling and execution of business processes. Business processes control which piece of work of a network of pieces of work will be performed by whom and which resources are to be exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers to bring the product to market for the least cost and within schedule while maintaining or even increasing product quality. Many companies are realizing that the conventional product design process is not satisfactory to meet these needs. They require early involvement of manufacturing engineering, cost engineering, logistic planning, procurement, manufacturing, service and support with the design effort. Furthermore, they require planning and control of product data through design, release, and manufacturing.

The correct and efficient execution of business processes within a company, e.g. development or production precesses, is of enormous importance for a company and has significant influence on a company's overall success in the market place. Therefore, those processes have to be regarded as similar to technology processes and have to be tested, optimized and monitored. The management of such processes is usually performed and supported by a computer based process or workflow management system.

In D. J. Spoon: "Project Management Environment", IBM Technical Disclosure Bulletin, Vol. 32, No. 9A, February 1990, pages 250 to 254, a process management environment is described including an operating environment, data elements, and application functions and processes.

In R. T. Marshak: "IBM's FlowMark, Object-Oriented Workflow for Mission-Critical Application", Workgroup Computing Report (USA), Vol. 17 No. 5, 1994, page 3 to 13, the object character of IBM FlowMark as a client/server product built on a true object model that is targeted for mission-critical production process application development and deployment is described.

In H. A. Inniss and J. H. Sheridan: "Workflow Management Based on an Object-Oriented Paradigm", IBM Technical Disclosure Bulletin, Vol. 37, No. 3, March 1994, page 185, other aspects of object-oriented modeling on customization and changes are described.

In F. Leymann and D. Roller: "Business Process Management with FlowMark", Digest of papers, Cat. No. 94CH3414-0, Spring COMPCON 94, 1994, pages 230 to 234, the state-of-the-art computer process management tool IBM FlowMark is described. The meta model of IBM FlowMark is presented as well as the implementation of IBM FlowMark. The possibilities of IBM FlowMark for modeling of a business process as well as their execution are discussed. The product IBM FlowMark is available for different computer platforms and documentation for IBM FlowMark is available in every IBM branch.

In F. Leymann: "A meta model to support the modeling and execution of processes", Proceedings of the 11$^{th}$ European Meeting on Cybernetics and System Research EMCR92, Vienna, Austria, Apr. 21 to 24, 1992, World Scientific 1992, pages 287 to 294, a meta model for controlling business processes is presented and discussed in detail.

The "IBM FlowMark for OS/2", document number GH 19-8215-01, IBM Corporation, 1994, available in every IBM sales office, represents a typical modern, sophisticated, and powerful workflow management system. It supports the modeling of business processes as a network of activities; refer for instance to "Modeling Workflow", document number SH 19-8241, IBM Corporation, 1996. As further information on Workflow Management Systems available in IBM sales offices one could mention: IBM MQSeries Concepts and Architecture, document number GH 12-6285; IBM MQSeries Getting Started with Buildtime, document number SH 12-6286; IBM MQSeries Getting Started with Runtime, document number SH 12-6287. This network of activities, the process model, is constructed as a directed, acyclic, weighted, colored graph. The nodes of the graph represent the activities or work items which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e.g. by assigning tasks to a work list according to the respective person, wherein said work list is stored as digital data within said workflow or process management computer system.

In F. Leymann and W. Altenhuber: "Managing business processes as an information resources", IBM Systems Journal, Vol. 32(2), 1994, the mathematical theory underlying the IBM FlowMark product is described.

In D. Roller: "Verification von Workflows in IBM FlowMark", in J. Becker und G. Vossen (Hrsg.): "Geschaeftsprozessmodellierung und Workflows", International Thompson Publishing, 1995, the requirement and possibility of the verification of workflows is described. Furthermore the feature of graphical animation for verification of the process logic is presented as it is implemented within the IBM FlowMark product.

For implementing a computer based process management system, firstly the business processes have to be analyzed and, as the result of this analysis, a process model has to be constructed as a network of activities corresponding to the business process. In the IBM FlowMark product, the process models are not transformed into an executable form. At run time, an instance of the process is created from the process model, called a process instance. This process instance is then interpreted dynamically by the IBM FlowMark product.

A user typically interacts with the workflow management system via a graphical end user that represents the tasks to be performed by the user as icons. Work for a particular task is started by the user by double-clicking on the appropriate icon which in turn starts the program implementing the activity.

Another area of technology is the technology of performance or workload management. Workload management tries to optimize the usage of processor resources from a global point of view: Many different services (i.e. instances of programs) on a given system (either uni-processor, multi-processor systems such as a sysplex) compete for processor resources. Workload management allows performance goals to be specified for each service class (i.e. an abstraction of services of the same kind) and for collections of service classes (called an enclave). Priorities of service classes and enclaves can be specified, defining their relative importance from an enterprises business point of view. The workload manager will make processing resources available to enable services and enclaves to meet their goals. Moreover the workload manager will withdraw or reduce processing resources from services and enclaves in case it becomes clear that a service or enclave will not meet its goal but another will be able to achieve it when more resources will be at its liberty or in case a higher priority service or enclave is in jeopardy for not meeting its goal because of lacking resources. Thus for each system, workload management handles the system resources. Workload management coordinates and shares performance information across the system. How well it manages one system is based on how well the other systems are also doing in meeting the goals. If there is contention for resources, workload management make the appropriate trade-offs based on the importance of the work and how well the goals are being met.

An enclave can be perceived as a set of service that are related from a business point of view, i.e. it is a unit of work that must jointly fulfill a performance goal. For example, a collection of application steps to be performed by a clerk while a customer is waiting for a response.

In the state of the art mission critical environment provide Workload Managers (WLM). For example, MVS delivers a built-in workload manager called WLM/MVS. For information on this prominent representative of a workload manager refer for instance to "OS/390 MVS Planning: Workload Management, Document Number GC28-1761-02" available through the IBM branch offices.

Currently the process to allow a program to participate in a workload management environment is cumbersome. With respect to a WLM, administrative personnel have to specify both enclaves as well as performance goals for service and enclaves. Application programmers have to use WLM APIs to provide at run time of their applications all necessary information to WLM enabling appropriate management of processor resources.

The derivation of enclaves is difficult and cumbersome in non-trivial cases because of the lack of information about the relation of application functions: This information is mostly hidden in special application programs, or the relation changes because of new requirements, because applications are integrated in new ways for interoperability etc. The situation is even worse in the case of integration of different applications, especially if the applications originally have not been designed to work together. Each individual application has to be instrumented with additional instructions interacting with the WLM; otherwise an application would not participate in the workload management process. For instance, application programmers have to instrument their code to create, join, and terminate enclaves via the API. This requires each of the different application functions to figure out whether it has to join an existing enclave and which one, etc.

The present invention is based on the objective to improve enablement for applications to participate in workload management.

SUMMARY OF THE INVENTION

The present invention relates to a method of providing workload-management in a Workflow-Management-System (WFMS) by a Workload-Management-System (WLM), the method being executed by at least one computer system. The WFMS comprises a process-model which comprises one or more activities which are the nodes of an arbitrary enclave-graph, and directed edges of the enclave-graph define a potential control-flow within the process-model. Within the method, the activities of the enclave-graph are executed as a workload-management-enclave. The method comprises an enclave-creation-step, wherein, if the control-flow enters the enclave-graph the first time, the WFMS creates a workload-management-enclave in the WLM on behalf of the activities.

This invention makes the specification and derivation of enclaves much easier than it is today. The complexity of writing application functions which are managed by WLM and that are included in higher level workload managed unities (i.e. enclaves) is drastically reduced. Moreover, workload management functionality is added to the WFMS.

According to the state-of-the-art, WLM assumes that the managed application is a self-instrumented component. Normally this would mean that the application itself has to use the WLM API to exchange information with the WLM environment. Thus this would require invasive changes to existing applications or to explicitly add code to newly written applications. Due to this additional effort, this would restrict the area of applicability of the WLM. Even worse, the instrumentation is not always possible; the source code is owned by another organization or is no longer available etc. The current invention allows applications to participate in WLM environments without special instrumentation of the corresponding applications. The current invention enables the participation of an application in workload management environments without special instrumentation of the corresponding applications.

The basic idea of the current invention is not to instrument the application components represented by the activities of the process model. The current invention creates the workload management enclave in the WLM by the WFMS on behalf of the activities. This solution provides workload management without any modification of the managed activity/application. As a consequence, no special code has to be added to newly or existing applications to enable them for workload management. It is the WFMS that determines the appropriate WLM to furnish the workload management on behalf of the application.

There are different and incompatible WLM products in the marketplace. Without the current invention, the application provider has to decide which of the systems management environments to use, which in the worst case means that he has to furnish all of them. The current invention allows this decision to be made on the application integration level, i.e. on the level of the process model. Moreover, as the WFMS has the information on which application it has to start, the current invention is flexible enough to allow it to make the decision on which WLM product to involve, on the basis of each individual application. Therefore according to the invention, an application is (to a certain extent) decoupled from the specific WLM product.

But not only applications within a process model will benefit from the current invention. As it becomes much easier to enable activities for workload management, the throughput through a computer system in general can be increased, giving advantages to all programs being executed on that computer system.

The proper management of processing resources reduces the total cost of ownership of computing environments. Application systems being enabled for workload management might become preferable in environments providing workload management.

According to a further embodiment of the invention, the method comprises an enclave-join-step, wherein, if the control-flow enters an activity which is a node within the enclave-graph and if a workload-management-enclave has already been created for the enclave-graph, the WFM joins the activity to the workload-management-enclave in the WLM on behalf of the activity.

The advantages mentioned above apply to this further embodiment as well. Moreover the invention unburdens the activities/applications not only from creating workload management enclaves but also from joining existing enclaves. According to a further embodiment of the invention, the method comprises an enclave-deletion-step, wherein, if the control-flow leaves the enclave-graph, the WLM deletes the workload-management-enclave on behalf of the activities.

The advantages mentioned above apply to this further embodiment as well. Moreover the invention unburdens the activities/applications not only from creating workload management enclaves but also from deleting existing enclaves. Thus all interactions of an application with the WLM required according to the state-of-the-art are no longer necessary and are taken over by the WFMS.

According to a further embodiment of the invention, an enclave-identifier of the workload-management-enclave is provided to the activities. Independently thereof, if any activity is to be executed within an execution-environment, an enclave-identifier of the workload-management-enclave is provided to the execution-environment.

Due to that feature, it is up to the activity/application, if workload management is provided "transparently" for it, or if it might influence it using the provided enclave identifier. Providing the enclave-identifier of the workload-management-enclave to the execution-environment is of special advantage as certain execution environments are implemented as subsystems comprising separate workload managers. These separate workload managers are able to cooperate with the global WLM but require for this cooperation the enclave identifiers of an enclave within the global WLM.

According to a further embodiment of the invention, the enclave-identifier of the workload-management-enclave is provided to the activities as an element in an input-container. This is the most elegant and economic approach for providing the enclave identifier to the activities. Neither within the WFMS nor within the application implementing the activity are further changes required as this established way of providing information from the WFMS to the activity.

According to a further embodiment of the invention, the method is executed by a WFMS-engine, navigating through the process-model, or the method is executed by a WFMS-agent, responsible to start an activity.

Executing the method by the WFMS-engine is advantageous as all information regarding the process model (including all run time parameters for a current instantiation of the process model)—comprising the enclave graph structure—is available to the WFMS-engine. On the other hand, executing the method by a WFMS-agent allows the off-load of certain work from the WFMS-engine, increasing parallelism within the WFMS environment.

The present invention is further directed to a method of automatically determining at least one enclave-graph within a process-model of a Workflow-Management-System (WFMS). The process-model of a Workflow-Management-System (WFMS) comprises one or more activities which are the nodes of an arbitrary graph, and directed edges of the graph define a potential control-flow within the process-model. The enclave-graph is a sub-graph of the graph comprising activities to be treated as a workload-management-enclave by a Workload-Management-System (WLM). The method determines the enclave-graph by including an activity into the enclave-graph if the process-model specifies the activity as being executable without user interaction.

The advantages mentioned above apply to this further embodiment as well. Additional benefits arise as application programmers or administrators now have an automatic procedure at hand for determining and defining enclave structures. Even more important, while in the current state of the art the enclave structure is not explicit—one would have to analyze each and every application to determine the enclaves "created by", "deleted by" or "joined to " by the applications—the current invention makes the enclave structure explicit on the global level of the process models. Thus the enclave structures are no longer "buried" within the individual applications. Due to the current invention, enclave structures now can be quickly created or modified.

According to a further embodiment of the invention, the proposed method determines the enclave-graph by including an activity into the enclave-graph, if the activity and all other activities of the enclave-graph are members of the same atomic-sphere, the atomic-sphere comprising activities to be executed as a transaction.

As global transactions are activities belonging to an atomic sphere, they are subject to the ACIDicity (atomicity, consistency, isolation, durability) requirement. By using the information within the process model with respect to atomic spheres to define enclaves, the WLM is enabled at execution time to process the atomic sphere efficiently in terms of ACIDicity.

BRIEF DESCRIPTION OF THE DRAWINGS

Preferred embodiments of the present invention will now be described, by way of example only, with reference to the accompanying drawings in which:

FIG. 1 gives an example of automatically deriving enclaves for a workload management system (WLM) from process models of a workflow management system (WFMS).

FIG. 2 depicts the new modeling construct in FlowMark's Definition Language (FDL) based on an example of an enclave graph definition.

FIG. 4 illustrates significant steps of the present invention in a process flow block diagram for a method of providing workload-management in a Workflow-Management-System (WFMS) by exploiting a Workload-Management-System (WLM).

DETAILED DESCRIPTION OF THE PREFERRED EMBODIMENTS OF THE INVENTION

Figure 3:
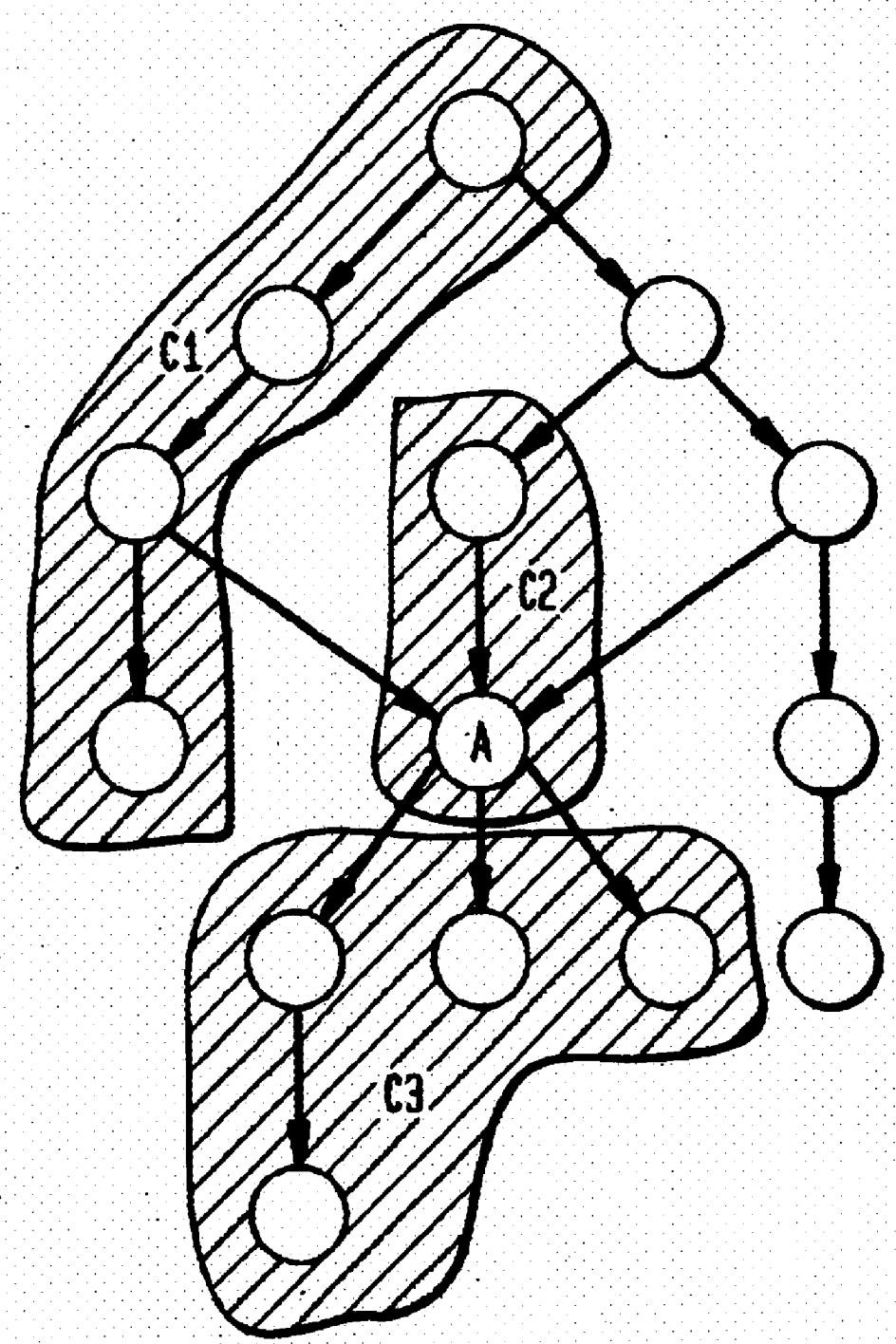
FIG. 3 visualizes certain scenarios within process models being or not being candidates for enclaves graphs.

The current invention is illustrated based on IBM's Flowmark workflow management system. Of course any other WFMS could be used instead. Furthermore, the current teaching applies also to any other type of system which offers WFMS functionalities not as a separate WFMS but within some other type of system.

Moreover the same statement holds true also for the specific workload management system. If the current specification relies on IBM's workload management system running under OS/390 MVS, this should be understood as an example not limiting the scope of the invention.

The following is a short outline on the basic concepts of a workflow management system based on IBM's FlowMark WFMS:

From an enterprise point of view, the management of business processes is becoming increasingly important: business processes, or process for short, control which piece of work will be performed by whom and which resources are exploited for this work, i.e. a business process describes how an enterprise will achieve its business goals. A WFMS may support both the modeling of business processes and their execution.

Modeling of a business process as a syntactical unit in a way that is directly supported by a software system is extremely desirable. Moreover, the software system can also work as an interpreter basically receiving as an input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a scheme describing all possible execution variants of a particular kind of business process. An instance of such a model and its interpretation represents an individual process, i.e. a concrete, context dependent execution of a variant prescribed by the model. A WFMS facilitates the management of a business process. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark, these buildtime definitions of the process models are then converted into process templates for use by FlowMark at runtime. Important components of the FlowMark process model are:

Processes

Activities

Blocks

Control Flows

Connectors

Data Containers

Data Structures

Conditions

Programs

Staff

Not all of these elements will be described below.

With this background a process, modeled by a process model within Flowmark, is a sequence of activities that must be completed to accomplish a task. The process is the top-level element of a FlowMark workflow model. In a FlowMark process, it can be defined:

How work is to progress from one activity to the next

Which persons are to perform activities and what programs they are to use

Whether any other processes, called subprocesses, are nested in the process

Of course multiple instances of a Flowmark process can run in parallel.

Activities are the fundamental elements of the meta model. An activity represents a business action that is from a certain perspective a semantical entity of its own. With the model of the business process, it might have a fine-structure that is then represented in turn via a model, or the details of it are not of interest at all from a business process modeling point of view. Refinement of activities via process models allows for both, modeling business processes bottom-up and top-down. Activities being a step within a process represent a piece of work that the assigned person can complete by starting a program or another process. In a process model, the following information is associated with each activity:

What conditions must be met before the activity can start

Whether the activity must be started manually by a user or can start automatically What condition indicates that the activity is complete Whether control can exit from the activity automatically or the activity must first be confirmed as complete by a user How much time is allowed for completion of the activity Who is responsible for completing the activity Which program or process is used to complete the activity Which program or process is used to complete the activity What data is required as input to the activity and as output from it A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used as the exit condition for the program activity and for the transition conditions to other activities.

Process activity: Has a (sub-) process assigned to perform it. The process is invoked when the activity is started. A process activity represents a way to reuse a set of activities that are common to different processes. Output from the process can be used in the exit conditions for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions. The results that are in general produced by the work represented by an activity is put into an output container which is associated with each activity. Since an activity will in general require access to output containers of other activities, each activity is associated in addition with an input container. At run time, the actual values for the formal parameters building the input container of an activity represent the actual context of an instance of the activity. Each data container is defined by a date structure. A data structure is an ordered list of variables, called members, that have a name and a data type. Data connectors represent the transfer of data from output containers to input containers, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Thus control connectors model the potential flow of control within a business process model. Default connectors specify where control should flow when the transition condition of no other control connector leaving an activity evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models, logical expressions can be defined that are evaluated by FlowMark at run time to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts. In addition, a Boolean expression called a transition condition is associated with each control connector. Parameters from output containers of activities having already produced their results are followed as parameters referenced in transition conditions. When at run time an activity terminates successfully, all control connectors leaving this activity are determined and the truth value of the associated transition conditions is computed based on the actual values of their parameters. Only the end points of control connectors, the transition conditions of which evaluated to TRUE, are considered as activities that might be executed based on the actual context of the business process. Thus transition conditions model the context dependent actual flow of control within a business process (i.e. an instance of a model). Business processes encompass long running activities in general; such activities need to be allowed to become interrupted. Thus, termination of an activity does not necessarily indicate that the associated task has been finished successfully. In order to allow the measurement of successfullness of the work performed by an activity a Boolean expression called an exit condition is associated with each activity. Only the activities, the exit condition of which evaluated to true in the actual context, are treated as successfully terminated. For determination of the actual control flow precisely, the successfully terminated activities are considered. Thus the logical expression of an exit condition, if specified, must evaluate to true for control to pass from an activity or block.

Besides describing the potential flow of control and data between activities, a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the Flowmark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

Process definition includes modeling of activities, control connectors between the activities, input/output containers, and data connectors. A process is represented as a directed acyclic graph with the activities as nodes and the control/data connectors as the edges of the graph. The graph is manipulated via a built-in, event-driven, CUA complaint graphic editor. The data containers are specified as named data structures. These data structures themselves are specified via the DataStructureDefinition facility. FlowMark distinguishes three main types of activities: program activities, process activities, and blocks. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows to construct a process through permanent refinement of activities into program and process activities (top-down), but also to build a process out of a set of existing processes (bottom-up). In particular, process activities help to organize the modeling work if several process modelers are working together. It allows the team members to work independently on different activities. Program and process activities can be associated with a time limit. The time limit specifies how long the activity may take. If the time is exceeded, a designated person is notified. If this person does not react within another time limit, the process administrator is notified. It not only helps to recognize critical situations but also to detect process deficiencies as all notifications are recorded in an audit trial.

All data structures used as templates for the container of activities and processes are defined via the Data Structure Definition Facility. Data Structures are names and are defined in terms of elementary data types, such as float, integer, or string and references to existing data structures. Managing data structure as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows to make changes to the process model without affecting executing process instances. A process instance is started either via the graphical interface or via the callable process application programming interface. When a process is started, the start activities are located, the proper people are determined, and the activities are posted onto the work list of the selected people as work items. If a user selects the work item, i.e. the activity, the activity is executed and removed from the work list of any other user to whom the activity has been posted. After an activity has been executed, its exit condition is evaluated. If not met, the activity is rescheduled for execution, otherwise all outgoing control connectors and the associated transition conditions are evaluated. A control connector is selected if the condition evaluates to TRUE. The target activities of the selected control connectors are then evaluated. If their start conditions are true, they are posted to the work list of selected people. A process is considered terminated if all end activities have completed. To make sure that all end activities finish, a dead path elimination is performed. It removes all edges in the process graph which can never be reached due to failing transition conditions. All information about the current state of a process is stored in the database maintained by the server. This allows for forward recovery in the case of crashes.

Every computer system installation wants to make the best use of its resources and maintain the highest possible throughput and achieve the best possible system responsiveness. With workload management, one defines performance goals and assigns a business importance to each goal. One defines the goals for work in business terms, and the system decides how much resource, such as CPU and storage, should be given to the work to meet its goal. An installation should know what it expects to accomplish in the form of performance goals, as well as how important it is to the business that each performance goal is achieved. With workload management, one defines performance goals for work, and the system matches resources to the work to meet those goals, constantly monitoring and adapting processing to meet the goals. Reporting reflects how well the system is doing compared to its goals.

In the following, terms and techniques are explained based on IBM's OS/390 MVS Workload Management System.

Performance administration is the process of defining and adjusting performance goals and resource groups based on installation business objectives. Workload management introduces the role of the service level administrator. The service level administrator is responsible for defining the installation's performance goals based on business needs and current performance. This explicit definition of workloads and performance goals is called a service definition. The service definition applies to all types of work, for instance CICS, IMS, TSO/E, OpenEdition MVS, JES, APPC/MVS, LSFM, DDF, DB2, SOM, Internet Connection Server and others. One can specify goals for all MVS managed work, whether it is online, transactions or batch jobs. The goals defined in the service definition apply to all work in the system or sysplex. When the service level requirements change, the service level administrator can adjust the corresponding workload management terms. Workload management provides an online panel-based application for setting up and adjusting the service definition. One specifies the service definition through this ISPF administrative application. Workload management provides the capability to collect performance and delay data in context of the service definition. The performance and delay data are available to reporting and monitoring products, so that they can use the same terminology.

Performance management is the process workload management uses to decide how to match resources to work according to performance goals and processing capacity. Workload management algorithms use the service definition information and internal monitoring feedback to check how well they are doing in meeting the goals. The algorithms periodically adjust the allocation of resource as the workload level changes. For each system, workload management handles the system resources. Workload management coordinates and shares performance information across the system or sysplex. How well it manages one system is based on how well the other systems are also doing in meeting the goals. If there is contention for resources, workload management makes the appropriate trade-offs based on the importance of the work and how well the goals are being met. Workload management can also dynamically start and stop server address spaces to process work from application environments. Workload management starts and stops server address spaces in a single system or across the sysplex to meet the work's goal. In addition to internal feedback monitoring, workload management keeps track of what is happening in the sysplex in the form of real time performance data collection, and delay monitoring. All this information is available for performance monitors and reporters for integration into detailed reports.

To make the most of workload management, work needs to be properly distributed so that MVS can manage the resources. It is essential that the subsystems (with separate execution environments) distributing work are configured properly for workload distribution in a system or sysplex. This is of specific importance if the subsystems have separate automatic and dynamic work balancing components, like: JES, CICS, IMS, DB2 etc . . . . This is achieved with the controls provided by each subsystem. For example, in a JES environment, one spreads initiator address spaces across each system.

The service definition contains all the information about the installation needed for workload management processing. There is one service definition for the entire system or sysplex. The service level administrator specifies the service definition through the WLM administrative application. The service level administrator sets up "policies" within the service definition to specify the goals for work. A service level administrator must understand how to organize work, and be able to assign it performance objectives. A service definition identifies the workloads, the resource groups, the service classes, the service class periods, and goals based on the performance objectives. Moreover a service definition comprises classification rules. All this information makes up the service definition base. In more detail it comprises:

One or more service policies, which are named sets of performance goals workload management uses as a guideline to match resources to work. When a policy is activated, the overrides are merged with the service definition. One can have different policies to specify goals intended for different times. Service policies are activated by an operator command, or through the ISPF administrative application utility function.

Workloads, which aggregate a set of service classes together for reporting purposes; i.e. a group of work to be tracked, managed and reported as a unit; also, a group of service classes: within a workload, one can group work with similar performance characteristics into service classes. One can create a service class for a group of work with similar:

performance goals resource requirements business importance to the installation

Service classes, which are subdivided into periods, group work with similar performance goals, business importance, and resource requirements for management and reporting purposes. One assigns performance goals to the periods within a service class. One assigns a performance goal to each service class period, such as a response time goal indicating an importance. Importance is how important it is to your business that the performance goal be achieved. There are three kinds of goals: response-time, execution velocity, and discretionary. Response time goals indicate how quickly you want your work to be processed. Since response time goals are not appropriate for all kinds of work, such as long running batch jobs, there are execution velocity goals. Execution velocity goals define how fast work should run when ready, without being delayed for processor, storage, or I/O access. Execution velocity goals are intended for work for which response time goal are not appropriate, such as started tasks, or long running batch work. Discretionary goals are for low priority work for which you do not have any particular performance goal. Workload management then processes the work using resources not required to meet the goals of other service classes.

Because some work may have variable resource requirements, one can define multiple periods for a service class. Periods are a way of defining different goals for work depending on the amount of resources the work consumes. Typically, periods are used to give shorter transactions more aggressive goals and to give longer running work of the same type less aggressive goals. One may have multiple periods, each period except the last has a duration.

Duration is the amount of resources, in service units, that the work consumes before it is switched to the goals of the next period. One can also group work into a service class based on resource requirements. If one has a group of batch work that can consume vast amounts of resources, and one wants to limit it, one can define a service class and assign it to a resource group with a maximum amount of capacity. If the work exceeds that capacity, workload management slows the execution rate. Also, if a certain group of work needs a minimum amount of processor capacity, one can set up a service class and assign it to a resource group.

Resource groups: an amount of processing capacity across one or more MVS images, assigned to one or more service classes defining processor capacity boundaries. One can assign a minimum and maximum amount of CPU service units per to work by assigning a service class to a resource group.

Classification rules, which determine how to assign incoming work to a service class and report class.

Application environments are execution environments, which are groups of application functions that execute in server address spaces and can be requested by a client. Workload management manages the work according to the defined goal, and automatically starts and stops server address spaces as needed.

An enclave is work to be processed like a transaction that can span multiple dispatchable units (SRBs and tasks) in one or more address spaces and is reported on and managed as a unit. The enclave is managed separately from the server address space or spaces it runs in. CPU and I/O resources associated with processing the work are managed by the work's performance goal, accounted to the work, and reported to the work. A program can create an enclave, schedule SRBs into it, or join tasks to it. An enclave created in one address space can have any number of SRBs or tasks associated with multiple address spaces. The scope of an enclave transaction is a single system. This means one cannot continue an enclave transaction to another system.

An enclave can be used in case of a work/transaction that spans multiple tasks or SRBs in one or more address spaces, and one wants to manage it as a unit. An enclave allows you to manage and report on resource consumption in the enclave based on a performance goal unrelated to the performance goal(s) of the address space(s) in which the enclave's dispatchable units execute. An independent enclave represents a complete transaction. Its performance goal is assigned based on the service class to which it is classified when the enclave is created. Each independent enclave starts in period of its service class (or PGN) and switches periods based on the service consumed by the dispatchable units belonging to the enclave. A dependent enclave represents the continuation of an existing address space transaction under a new set of dispatchable units. Its performance goal is inherited from the existing address space transaction based on the service class (or PGN) and period being used to manage the address space at the instant the dependent enclave is created. CPU service consumed by a dependent enclave is treated as if it were consumed by the address space along with the dependent enclave to switch into later periods.

An enclave must be created before it can participate in the workload management environment. The following services, which have to be coded by application programmers within the application, to work with enclaves are available:

The IWMECREA macro allows you to create an enclave.

The IEAMSCHD macro allows you to schedule an SRB into the existing enclave.

The SYSEVENT ENCASSOC macro allows an enclave running SRBs to be associated with an address space so the server address space's storage-related resources can be managed to the enclave's performance goal.

The IWMEJOIN macro allows a task to join an enclave.

The IWMELEAV macro allows a task to leave an enclave.

The IWMECQRY macro allows a program to query the classification information associated with an enclave.

The IWMESQRY macro provides a program with information about whether the current dispatchable unit is associated with an enclave.

The IWMEDELE macro allows a program to delete a previously created enclave.

Process models for instance in workflow management systems encompass many information about the semantic relations of application functions. Based on the nature of enclaves as being units of work that should be pushed through the system in "optimal time", sequences of automatic activities (to be more precise: connected graphs defined by collections of automatic activities) and atomic spheres (atomic spheres are collection of transactional work items, i.e. activities within the process model, with a common commit scope and thus representing a global transaction. For the purpose to define such atomic spheres, the process model can be analyzed to identify subgraphs having the property that such a subgraph does not contain not necessarily different activities which are connected by a path of control connectors which contains at least one activity not contained in said atomic-sphere) are candidates for enclaves etc. Thus the fundamental insight is that enclave candidates can be derived algorithmically and automatically from process models.

FIG. 1 gives an example of automatically deriving enclaves for a workload management system (WLM) from process models of a workflow management system (WFMS). The left hand side of FIG. 1 shows an example of a process model in a WFMS. The nodes represent the activities and the edges the control connectors. Activities, which are defined in the process model as automatically executable, i.e. not requiring user interaction or input from a user, are flagged with <auto>. Also a subgraph (101) specified within the process model as an atomic sphere is reflected. The right hand side of FIG. 1 visualizes the enclave graphs E1, E2, automatically generated by the proposed method of the current invention. Two approaches for automatically generating enclave graphs are suggested:

The specifications making up the process model are analyzed for "automatic" activities. Subgraphs of he process model, like E1 and E3, comprising "automatic" activities are then automatically defined as enclave graphs.

The specifications making up the process model are analyzed for "atomic sphere" activities. Subgraphs of the process model, like E2, comprising an "atomic sphere" are then automatically defined as enclave graphs.

Once the enclave graphs within a process model have been defined, the current invention teaches that the WFMS creates a workload management enclave in the WLM on behalf of the activities within the enclave graph; more information on that aspect is given below.

Thus in summary in FIG. 1 it is shown how consecutive sequences of activities that have been defined in the process model as to be started automatically are mapped onto enclaves (E1 and E3). Also, the atomic sphere AS-1 is mapped onto an enclave, namely E2.

In addition to the above approach of automatically generating enclave graphs from a process model, a new construct is proposed which may be added to the workflow meta model which allows to explicitly specify enclaves during the workflow modeling process. Of course these explicitly specified enclaves can be based on the criteria mentioned above. Moreover the approach of generating the enclave graphs automatically and the approach of explicitly specifying the enclave graphs can be combined.

Expressing the new modeling construct in Footmark's Definition Language (FAL) as an example of an enclave graph definition is given in FIG. 2. The new keyword ENCLAVE starts the definition of an enclave graph followed by its name, E3 in the current example. The example of FIG. 2 could be the specification of the enclave E3 of FIG. 1. The RELATED_CLASSIFICATION keyword refers to a service class definition, in this example "DINKY", within the WLM. RELATED_ACTIVITIES is the defining construct for listing the process activities of the process model, which are to be treated as the enclave graph. In the current example, the process activities Pr_Act1, Pr_Act2, Pr_Act3, refer to (102), (103), (104) within FIG. 1, and are specified to form an enclave graph. The keywords DESCRIPTION and DOCUMENTATION are followed by description and documentation text.

Beside being semantically related from a business point of view, collections of activities are syntactically candidates for being defined as an enclave that are potentially run consecutively or in parallel at run time. Refer for instance to FIG. 3 for an example: Collection C1 is a candidate for an enclave graph because the enclosed activities may run consecutively. C2 is not a candidate because activity A is a join node and it is thus unlikely that the sources of its incoming control connectors terminate at about the same time—a prereq for not being enforced to wait for starting A. C3 is a candidate because the parallel activities are all dependent from the same source of control connectors, thus being started at about the same time.

FIG. 4 illustrates significant steps of the present invention in a process flow block diagram for a method at 40 of providing workload-management in a Workflow-Management-System (WFMS) by expoiting a Workload-Management-System (WLM), with the method being executed by a least one computer system.

The method comprises at 42 interpreting a process-instance's process-model of a WFMS, the process-model comprising one or more activities which define the nodes of an arbitrary graph, and directed edges of the graph defining a potential control-flow within the process-model.

The step of interpreting includes at 44 determining whether the process-model comprises an enclave-graph which is a sub-graph of the graph and comprises activities executable without user intervention.

The method includes at 46 creating an enclave wherein, if the control-flow enters the enclave-graph a first time, the WFMS creates a workload-management-enclave in the WLM on behalf of the activities.

The method includes at 48 enhancing the process-model with a specification reflecting the determined enclave-graph together with performance goals, the specification triggering the WFMS to exploit a Workload-Management-System (WLM) to treat the activities in the enclave-graph as a workload-management-enclave by the WLM, with the WLM using dynamic assignment of resources to achieve the performance goals at runtime of the process model.

The method further comprises at 50 an enclave-join step, wherein, if the control-flow enters an activity which is a node within the enclave-graph and if a workload-management-enclave has been created already for the enclave-graph, the WFMS joins the activity to the workload-management-enclave in the WLM on behalf of the activity.

The method includes at 52 an enclave-deletion-step, wherein, if the control-flow left the enclave-graph, the WLM deletes the workload-management-enclave on behalf of the activities.

The method includes at 54 providing an enclave-identifier of the workload-management-enclave to the activities, and/or at 54, wherein, if an activity is to be executed within an execution-enviroment, an enclave-identifier of the workload-management-enclave is provided to the execution-environment.

At step 56, the enclave-identifier of the workload-management-enclave is provided to the activities as an element in an input-container.

At step 58, the method is executed by a WFMS-engine, navigating through the process-model, or the method is executed by a WFMS-agent responsible to start an activity.

For example, if it is known there is a long lasting activity (like a web session or an edit session) within a candidate set of activities, this activity should not be part of an enclave.

Now, since the WFMS has at run time all the information about the enclaves (incorporated within the process model), it is the WFMS that can establish the enclave boundaries instead of and on behalf of the activities being part of and enclave graph: The WFMS can start the enclave when the control flow enters the enclave the first time. It can terminate the enclave when the control flow is ready to leave the enclave, i.e. when it is clear that no more work will be started within the scope of the current enclave. Also, when invoking activity implementations within the scope of an enclave, it can join the enclave on behalf of the application function.

If the current invention suggests the WFMS as the instance to create, join, delete etc. an enclave within the WLM, various implementation variants are possible: either the launching facility of the WFMS, i.e. the Program Execution Agent (PEA) in case of Footmark, or the workflow engine itself could be extended accordingly.

Furthermore, the WFMS can make the enclave identifier available to the application function implementing the process activity (e.g. via a special API, or by passing it to the application in its input container) so that this function is aware of its hosting enclave. The WFMS can pass the enclave identifiers also to the entity furnishing the application function's environment (e.g. CICS, IMS)—i.e. the applications function's execution environment—which is important to encompass these entities in the subject enclave. This is of special significance as certain execution environments are implemented as subsystems comprising separate workload managers. These separate workload managers are able to cooperate with the global WLM but require for this cooperation the enclave identifiers of an enclave within the global WLM.

This invention makes the specification and derivation of enclaves much easier than it is today. The complexity of writing application functions which are managed by a WLM and that are included in higher level workload managed units (i.e. enclaves) is drastically reduced.

Accordingly, the state of the art WLM assumes that the managed application is a self-instrumented component. Normally this would mean that the application itself has to use the WLM API to exchange information with the WLM environment. Thus this would require invasive changes to existing applications or to explicitly add code to newly written applications. Due to this additional effort, this would restrict the area of applicability of WLM. For instance, an application provider has to decide which of the available WLM environments to adhere with which in the worst case means that he has to furnish all of them. Even worse, the instrumentation is not always possible; the source code is owned by another organization or is no longer available etc. The current invention allows applications to participate in WLM environments without special instrumentation of the corresponding applications.

But not only applications within a process model will benefit from the current invention. As it becomes much easier to enable activities for workload management, the throughput through a computer system in general can be increased, giving advantages to all programs being executed on that computer system.

The proper management of processing resources reduces the total cost of ownership of computing environments. Application systems being enabled for workload management might become preferable in environments providing workload management.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method of providing workload-management in a Workflow-Management-System (WFMS) by exploiting a Workload-Management-System (WLM) said method being executed by a least one computer system, and comprising interpreting a process-instance's process-model of a WFMS, said process-model comprising one or more activities which define the nodes of an arbitrary graph, and directed edges of said graph defining a potential control-flow within said process-model, said step of interpreting including determining whether said process-model comprises an enclave-graph which is a sub-graph of said graph and comprises activities to be treated as a workload-management-enclave by said WLM, said workload-management-enclave being associated with performance goals which said WLM is trying to achieve at runtime by dynamic assignment of resources, and creating an enclave wherein, if said control-flow enters said enclave-graph a first time, said WFMS creates a workload-management-enclave in said WLM on behalf of said activities.

2. A method of providing workload-management in a Workflow-Management-System (WFMS) by a WLM according to claim 1, said method comprising an enclave-join step, wherein, if said control-flow enters an activity being a node within said enclave-graph and if a workload-management-enclave has been created already for said enclave-graph, said WFMS is joining said activity to said workload-management-enclave in said WLM on behalf of said activity.

3. A method of providing workload-management in a Workflow-Management-System (WFMS) by a WLM according to claim 1, said method comprising an enclave-deletion-step, wherein, if said control-flow left said enclave-graph, said WLM is deleting said workload-management-enclave on behalf of said activities.

4. A method of providing workload-management in a Workflow-Management-System (WFMS) by a WLM according to claim 1, wherein an enclave-identifier of said workload-management-enclave is provided to said activities, and/or wherein, if an activity is to be executed within an execution-environment, an enclave-identifier of said workload-management-enclave is provided to said execution-environment.

5. A method of providing workload-management in a Workflow-Management-System (WFMS) by a WLM according to claim 4, wherein said enclave-identifier of said workload-management-enclave is provided to said activities as an element in an input-container.

6. A method of providing workload-management in a Workflow-Management-System (WFMS) by a WLM according to claim 1, wherein said method is executed by a WFMS-engine, navigating through said process-model, or wherein said method is executed by a WFMS-agent, responsible to start an activity.

7. A computerized method of automatically determining at least one enclave-graph within a process-model of a Workflow-Management-System (WFMS) comprising, said process-model comprising one or more activities which are the nodes of an arbitrary graph, and directed edges of said graph defining a potential control-flow within said process-model, determining said enclave-graph by analyzing said process-model and identifying a sub-graph comprising activities being executable without user interaction, and enhancing said process-model with a specification reflecting said determined enclave-graph together with performance goals, said specification triggering said WFMS to exploit a Workload-Management-System (WLM) to treat said activities in said enclave-graph as a workload-management-enclave by said WLM, said WLM using dynamic assignment of resources to achieve said performance goals at runtime of said process-model.

8. A computerized method of automatically determining at least one enclave-graph within a process-model of a Workflow-Management-System (WFMS) comprising, determining said enclave-graph by analyzing said process-model and identifying a sub-graph comprising activities being executable without user interaction, and enhancing said process-model with a specification reflecting said determined enclave-graph together with performance goals, said specification triggering said WFMS to exploit a Workload-Management-System (WLM) to treat said activities in said enclave-graph as a workload-management-enclave by said WLM, said WLM using dynamic assignment of resources to achieve said performance goals at runtime of said process-model, said method determining said enclave-graph by including an activity into said enclave-graph, if said activity and all other activities of said enclave-graph being members of a same atomic-sphere, said atomic-sphere comprising activities to be executed as a transaction.

9. A system for providing workload-management in a Workflow-Management-System (WFMS) by exploiting a Workload-Management-System (WLM) and being executed by at least one computer system comprising, means for interpreting a process-instance's process-model of a WFMS, said process-model comprising one or more activities which define the nodes of an arbitrary graph, and directed edges of said graph defining a potential control-flow within said process-model, said means for interpreting including means for determining whether said process-model comprises an enclave-graph which is a sub-graph of said graph and comprising activities to be treated as a workload-management-enclave by said WLM, said workload-management-enclave being associated with performance goals which said WLM is trying to achieve at runtime by dynamic resource assignment of resources, and means for creating an enclave wherein, if said control-flow enters said enclave-graph a first time, creating a workload-management-enclave in said WLM on behalf of said activities.

10. A computerized system for automatically determining at least one enclave-graph within a process-model of a Workflow-Management-System (WFMS) comprising, means for determining said enclave-graph by analyzing said process-model and identifying a sub-graph comprising activities being executable without user interaction, and means for enhancing said process-model with a specification reflecting said determined enclave-graph together with performance goals, said specification triggering said WFMS to exploit a Workload-Management-System (WLM) to treat said activities in said enclave-graph as a workload-management-enclave by said WLM, said WLM using dynamic assignment of resources to achieve said performance goals at runtime of said process-model.

11. A data processing program for execution in a data processing system comprising software code portions for performing a method of providing workload-management in a Workflow-Management-System (WFMS) by exploiting a Workload-Management-System (WLM), said method being executed by a t least one computer system and comprising, interpreting a process-instance's process-model of a WFMS, said process-model comprising one or more activities which define the nodes of an arbitrary graph, and directed edges of said graph defining a potential control-flow within said process-model, said step of interpreting including determining whether said process-model comprises an enclave-graph which is a sub-graph of said graph and comprises activities to be treated as a workload-management-enclave by said WLM, said workload-management-enclave being associated with performance goals which said WLM is trying to achieve at runtime by dynamic assignment of resources, and creating an enclave wherein, if said control-flow enters said enclave-graph a first time, said WFMS creates a workload-management-enclave in said WLM on behalf of said activities.

12. A data processing program for execution in a data processing system comprising software code portions for performing a computerized method of automatically determining at least one enclave-graph within a process-model of a Workflow-Management-System (WFMS) comprising, determining said enclave-graph by analyzing said process-model and identifying a sub-graph comprising activities being executable without user interaction, and enhancing said process-model with a specification reflecting said determined enclave-graph together with performance goals, said specification triggering said WFMS to exploit a Workload-Management-System (WLM) to treat said activities in said enclave-graph as a workload-management-enclave by said WLM, said WLM using dynamic assignment of resources to achieve said performance goals at runtime of said process-model.

13. A computer program product stored on computer usable medium, comprising computer readable program means for causing a computer to perform a method of providing workload-management in a Workflow-Management-System (WFMS) by exploiting a Workload-Management-System (WLM), said method being executed by at least one computer system and comprising, interpreting a process-instance's process-model of a WFMS, said process-model comprising one or more activities which define the nodes of an arbitrary graph, and directed edges of said graph defining a potential control-flow within said process-model, said step of interpreting including determining whether said process-model comprises an enclave-graph which is a sub-graph of said graph and comprises activities to be treated as a workload-management-enclave by said WLM, said workload-management-enclave being associated with performance goals which said WLM is trying to achieve at runtime by dynamic assignment of resources, and creating an enclave wherein, if said control-flow enters said enclave-graph a first time, said WFMS creates a workload-management-enclave in said WLM on behalf of said activities.

14. A computer program product stored on a computer usable medium, comprising computer readable program means for causing a computer to perform a computerized method of automatically determining at least one enclave-graph within a process-model of a Workflow-Management-System (WFMS) comprising, determining said enclave-graph by analyzing said process-model and identifying a sub-graph comprising activities being executable without user interaction, and enhancing said process-model with a specification reflecting said determined enclave-graph together with performance goals, said specification triggering said WFMS to exploit a Workload-Management-System (WLM) to treat said activities in said enclave-graph as a workload-management-enclave by said WLM, said WLM using dynamic assignment of resources to achieve said performance goals at runtime of said process-model.

* * * * *